US011890861B2

(12) United States Patent
Schloerholz et al.

(10) Patent No.: US 11,890,861 B2
(45) Date of Patent: Feb. 6, 2024

(54) METHOD OF CURING COATINGS IN A PRINTING MACHINE USING DIFFERENTLY ACTUATED GAS DISCHARGE LAMPS, PRINTING MACHINE AND METHOD OF USING A GAS-DISCHARGE LAMP

(71) Applicant: HEIDELBERGER DRUCKMASCHINEN AG, Heidelberg (DE)

(72) Inventors: Matthias Schloerholz, Plankstadt (DE); Michael Kohlmann, Frankenthal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 38 days.

(21) Appl. No.: 17/695,216

(22) Filed: Mar. 15, 2022

(65) Prior Publication Data

US 2022/0297450 A1 Sep. 22, 2022

(30) Foreign Application Priority Data

Mar. 17, 2021 (DE) ..................... 10 2021 106 453.8

(51) Int. Cl.
*B41J 11/00* (2006.01)

(52) U.S. Cl.
CPC ............................... *B41J 11/00218* (2021.01)

(58) Field of Classification Search
CPC .............. B41J 11/00218; B41J 11/0015; B41J 11/00212; B41J 11/00214; B41J 2/447; B41M 7/00; H01J 61/16
See application file for complete search history.

(56) References Cited

U.S. PATENT DOCUMENTS

| | | | |
|---|---|---|---|
| 3,930,064 | A | 12/1975 | Sander |
| 6,572,932 | B2 | 6/2003 | Sigel et al. |
| 8,408,689 | B2 | 4/2013 | Roof et al. |
| 2003/0081096 | A1 | 5/2003 | Young |
| 2003/0227527 | A1 | 12/2003 | Richards |
| 2005/0018026 | A1 | 1/2005 | Nerad et al. |
| 2007/0273739 | A1 * | 11/2007 | Rodin ................ B41J 11/00212 347/102 |
| 2018/0345682 | A1 | 12/2018 | Verhofstad et al. |

FOREIGN PATENT DOCUMENTS

| | | | |
|---|---|---|---|
| DE | 2019270 | A1 | 11/1971 |
| DE | 20316180 | U1 | 5/2004 |
| DE | 60014794 | T2 | 3/2006 |
| DE | 102011082315 | A1 | 4/2012 |
| JP | 2014184433 | A | 10/2014 |

* cited by examiner

*Primary Examiner* — Bradley W Thies
(74) *Attorney, Agent, or Firm* — Laurence A. Greenberg; Werner H. Sterner; Ralph E. Locher

(57) ABSTRACT

A method of curing radiation-curable coatings in printing machines using UV light includes using the same light source or sources for the pinning and final curing operations in two different modes of operation suitable for pinning and for completely curing. The light sources are preferably gas-discharge lamps, in particular xenon flash lamps. A printing machine and a method for using at least one gas-discharge lamp are also provided.

12 Claims, 2 Drawing Sheets

METHOD OF CURING COATINGS IN A PRINTING MACHINE USING DIFFERENTLY ACTUATED GAS DISCHARGE LAMPS, PRINTING MACHINE AND METHOD OF USING A GAS-DISCHARGE LAMP

CROSS-REFERENCE TO RELATED APPLICATION

This application claims the priority, under 35 U.S.C. § 119, of German Patent Application DE 10 2021 106 453.8, filed Mar. 17, 2021; the prior application is herewith incorporated by reference in its entirety.

FIELD AND BACKGROUND OF THE INVENTION

The present invention relates to a method of curing coatings in a printing machine, to such a printing machine, and to a method for using a gas discharge lamp for the pinning and final curing of radiation-curable coatings in a printing machine.

In order to create printed products in printing machines, various printing fluids may be applied to printing substrates such as paper, cardboard, or foil. In general, those printing fluids are printing inks, varnishes, or combinations thereof. Once the printing fluids have been applied, the printed printing substrate needs to be dried in the printing machine.

A common group of printing fluids is dried by removing the solvent, usually water. That process usually relies on infrared driers and hot-air driers provided in the printing machine.

Another common group of printing fluids is dried under the influence of UV radiation or electron radiation. Those printing fluids are frequently composites on the basis of acrylates or other unsaturated compounds, which polymerize and are thus cured under the influence of UV light or electron radiation, sometimes in the presence of one or more photoinitiators.

The curing process of UV-curable coatings in printing machines usually occurs in two stages. In a first step, the radiation-curable coating such as a UV ink or UV varnish is only partially cured. That partial curing is also referred to as pinning. For that purpose, the radiation-curable coating is usually irradiated with a comparatively low dosage of rather longer-wave UV radiation shortly after its application to the printing substrate. That sufficiently fixes the printed image for it to continue being transported through the machine to receive printing fluids of different colors without any undesired modifications. The prior art commonly uses LED lamps for the pinning process.

In a second step, which usually takes place at the end of the printing operation once all of the colors have been applied to the printing substrate and the latter has been finished with a UV varnish if desired, the final curing takes place. For the final curing process, the prior art commonly uses mercury vapor lamps, which emit particularly short-wave UV light of high intensity. Thus, the curing reaction of the pinned radiation-curable coating is completed or nearly completed. That results in cured printed products such as printed packaging, posters, or brochures, which may be used as intended without sticking or rubbing.

German Patent Application DE 2019 270 A1, corresponding to U.S. Pat. No. 3,390,064, discloses a method and a device for curing a coating applied to a body wherein xenon flash tubes are mentioned as the radiation source. The document does not disclose any two-stage curing process in a printing machine.

In the printing industry, there is a demand for low-cost curing solutions that do not take up much space. Those solutions need to have as few actuation components as possible and must be easy to cool and service. Moreover, from an ecological point of view, the use of mercury vapor lamps should be reduced.

SUMMARY OF THE INVENTION

Surprisingly, it has been found that gas-discharge lamps such as xenon flash lamps may be actuated in two different modes of operation, in the process emitting radiation which is particularly suited for pinning and curing radiation-curable coatings in printing machines.

It is accordingly an object of the invention to provide a method of curing coatings in a printing machine using differently actuated gas discharge lamps, a printing machine and a method of using a gas-discharge lamp, which overcome the hereinafore-mentioned disadvantages of the heretofore-known methods, printing machines and lamps of this general type.

The invention has a number of advantages: The same type of lamp may be used for pinning and final curing and therefore a single control device may be used instead of two separate control devices. This simplifies the supply of spare parts and maintenance work. If the irradiation of the printing substrate is controlled by further components such as shutters or the like, pinning and curing may be done by selectively actuating one and the same lamp, and operating it in the first operating mode or in the second operating mode as needed. Thus space requirements and cooling in the printing machine may be optimized even further. Ecologically harmful mercury vapor lamps are no longer necessary.

With the foregoing and other objects in view there is provided, in accordance with the invention, a method of curing radiation-curable coatings in a printing machine comprising the steps of:

providing a printing substrate having a radiation-curable coating, by:

i) pinning the radiation-curable coating by applying a first radiation at a first location in the printing machine (4), and ii) completely curing the pinned radiation-curable coating by applying a second radiation at a location different than the first location in the printing machine;

using the same electrical radiation source or sources in a first electrical operating mode to apply the first radiation and in a second electrical operating mode to apply the second radiation; and the radiation applied by the electrical radiation source in the first electrical operating mode and in the second electrical operating mode having different radiation spectra.

In principle, possible radiation-curable coatings include all UV-curable compounds which may be processed in printing machines, in particular in inkjet printing machines, offset printing machines, and screen printing machines. The preferred radiation-curable coatings are UV-curable compounds selected from UV-curable inks, UV-curable varnishes, and blends thereof.

In a preferred embodiment, the electrical radiation source is at least one gas-discharge lamp, in particular at least one xenon flash lamp or krypton flash lamp. In a particularly preferred embodiment, it is a xenon flash lamp. Xenon flash lamps suitable for the invention are commercially available from Heraeus Noblelight GmbH, Hanau, Germany.

In a further preferred embodiment, the first electrical radiation source and the second electrical radiation source are identical. The electrical radiation source is preferably one of the radiation sources indicated above as the preferred electrical radiation sources.

In a particularly preferred embodiment, the pinning location is shielded during the final curing operation from the radiation of the electrical radiation source and the location of the final curing is shielded during the pinning operation from the radiation of the electrical radiation source. The incidence of the radiation on the printing substrate is preferably controlled by components which reversibly prevent irradiation, for instance by shutters which are opened and closed as needed.

In a further preferred embodiment, the spatial arrangement of the electrical radiation source in the printing machine is changed for the pinning operation as opposed to the final curing operation, for instance by moving the electrical radiation source on a rail or by rotating the electrical radiation source to change the location of incidence of the radiation. This allows the pinning and final curing operations to be carried out by actuating one and the same electrical radiation source in the first or second operating modes in accordance with the requirements.

In a further preferred embodiment the radiation spectrum in the second electrical operating mode is shifted towards shorter wavelengths compared to the radiation spectrum in the first electrical operating mode. The first electrical operating mode uses a longer-wavelength radiation spectrum, which is particularly suitable for pinning UV-curable coatings such as UV inks or UV varnishes. The second electrical operating mode uses a shorter-wavelength radiation spectrum, which is particularly suitable for the final curing of UV-curable coatings such as UV inks or UV varnishes.

In a further preferred embodiment, the wavelength width of the electrical radiation source in the second electrical operating mode differs from the wavelength width of the electrical radiation source in the first electrical operating mode.

In general, the voltage of the gas-discharge lamp, preferable a xenon flash lamp, determines the electrical power of the electrical radiation source and thus to what depth it permeates into the UV-curable coating. The flash time or impulse width determines the radiation dosage, i.e. the amount of energy, for the curing. The actuation parameters may vary as a function of the length and diameter of the utilized gas-discharge lamp, preferably a xenon flash lamp.

In a preferred embodiment, the first electrical operating mode and the second electrical operating mode differ in terms of at least one parameter which is selected from a list including voltage, current rating, and current density. The most preferred parameter is the current density. The current density of the preferred electrical radiation sources, in particular of gas-discharge lamps such as xenon flash lamps and krypton flash lamps, is in particular a function of the applied voltage and the flash time.

In a special embodiment, a xenon flash lamp is used and is actuated at a voltage of 200 V and a flash time of 5 milliseconds for the pinning operation and at a voltage of 355 V, and flashing times for a flash time of 1 millisecond each, for the final curing operation.

In a preferred embodiment, the electrical radiation source is pulsed, i.e. it flashes once or multiple times for the same or different flash times. In according with a particularly preferred aspect, the voltage and flash time at which the electrical radiation source is operated in the first electrical operating mode differs from the voltage and flash time in the second operating mode.

It is likewise possible to change the position and angle of the electrical radiation source as a function of the position, angle, and area coverage as well as of other substrate-dependent parameters. These changes may likewise be the result of optical or other measurements taken on the finished printed products or of data introduced into the printing operation such as digital print image data, substrate data, or parameters of the UV printing fluids.

With the objects of the invention in view, there is also provided a printing machine which uses the respective same electrical radiation source a) for pinning and b) for completely curing UV-curable coatings, wherein the electrical radiation source is at least one gas-discharge lamp. Preferred gas-discharge lamps are xenon flash lamps and krypton flash lamps.

In a preferred embodiment, the printing machine of the invention uses one and the same electrical radiation source for pinning and curing. Such a printing machine preferably includes reversibly radiation-blocking components such as shutters, a way of locally moving the radiation source, for instance on a rail, or a device for rotating the electrical radiation source to change the location of incidence of the radiation, or combinations of these measures.

With the objects of the invention in view, there is concomitantly provided a method of using at least one gas-discharge lamp, preferably a xenon flash lamp, for a) pinning and b) completely curing radiation-curable coatings in a printing machine. In a preferred embodiment, one and the same gas-discharge lamp, preferably a xenon flash lamp is used for a) pinning and b) completely curing in the printing machine.

Other features which are considered as characteristic for the invention are set forth in the appended claims.

Although the invention is illustrated and described herein as embodied in a method of curing coatings in a printing machine using differently actuated gas discharge lamps, a printing machine and a method of using a gas-discharge lamp, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
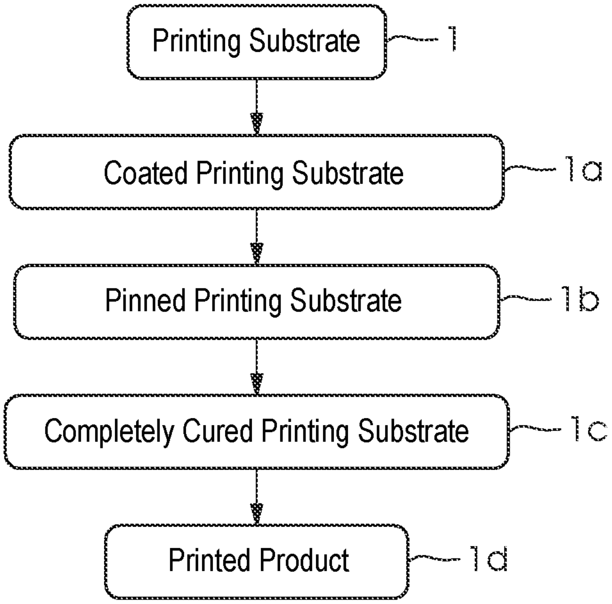
FIG. 1 is a flow chart of the method of the invention.

Referring now to the figures of the drawings in detail and first, particularly, to FIG. 1 thereof, there is seen a flow chart of the method of the invention. A printing substrate 1 has been transformed into a printing substrate 1*a* coated with a UV-curable coating, for instance by being printing on in a printing machine. An electrical radiation source emitting UV radiation is used in a first electrical operating mode to pin the coated printing substrate 1*a* and to obtain a pinned printing substrate 1*b*. The same electrical radiation source is then used in a second electrical operating mode for the final curing of the pinned printing substrate 1*b* to obtain a cured printing substrate 1*c*. At the exit of the printing machine, the completed printed product 1*d* is output.

Figure 2:
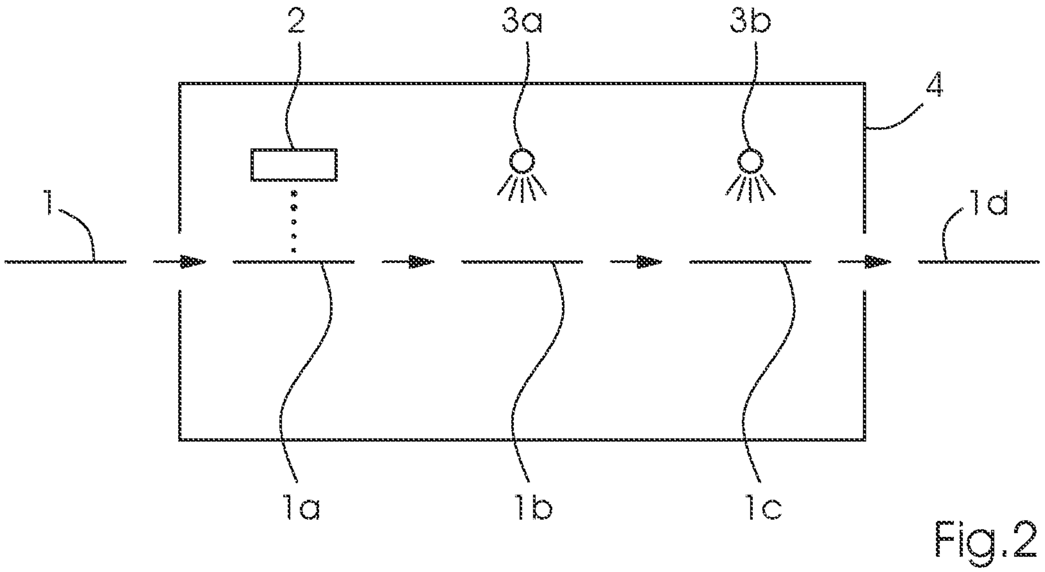
FIG. 2 is a diagrammatic view of an inkjet printing machine with two separate identical electrical radiation sources in which the method of the invention is implemented.

FIG. 2 is a diagrammatic illustration of the method of the invention implemented in an inkjet printing machine with two separate identical electrical radiation sources. A printing substrate 1 is introduced into a printing machine 4. An inkjet print head 2 applies UV-curable ink to the printing substrate 1 to create a coated printing substrate 1*a*. Irradiation by an electrical radiation source 3*a* in the first electrical operating mode creates a pinned printed product 1*b*. Irradiation by another, identical electrical radiation source 3*b* in the second electrical operating mode creates a completely cured printed product 1*c*. A completed printed product 1*d* is output at an exit of the printing machine.

Figure 3:
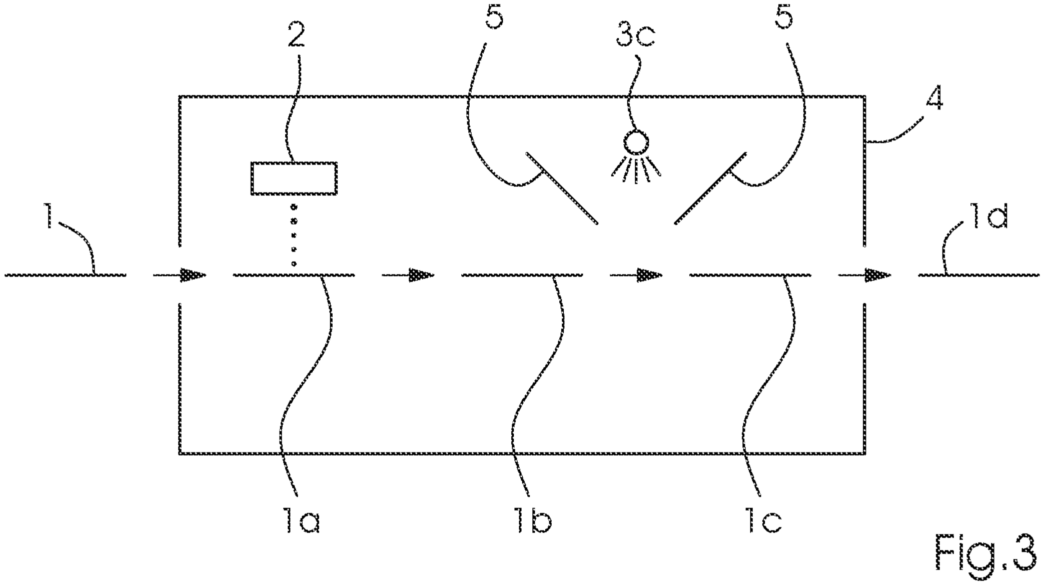
FIG. 3 is a diagrammatic view of an inkjet printing machine with a single electrical radiation source in which the method of the invention is implemented.

FIG. 3 is a diagrammatic illustration of the method of the invention implemented in an inkjet printing machine with a single electrical radiation source. A printing substrate 1 is introduced into the printing machine 4. An inkjet print head 2 applies UV-curable ink to the printing substrate 1 to create a coated printing substrate 1*a*. Irradiation by an electrical radiation source 3*c* in the first electrical operating mode results in a pinned printed product 1*b*. Irradiation by the same electrical radiation source 3*c* in the second electrical operating mode creates a cured printed product 1*c*. The completed printed product 1*d* is output at the exit of the printing machine. A shutter 5 is respectively opened and closed for the pinning and final curing operations to irradiate only the desired regions on the printing substrate 1*b* or 1*c* in each case.

Figure 4:
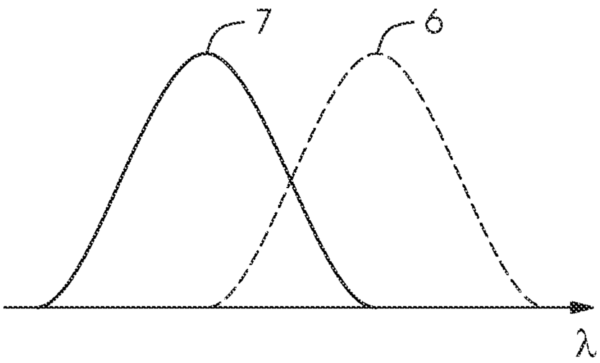
FIG. 4 is a diagram showing the wavelength spectra of the electrical radiation source in the first operating mode for pinning and in the second operating mode for curing.

FIG. 4 is a simplified view of the wavelength spectra of the electrical radiation source in the first operating mode 6 for pinning and in the second operating mode 7 for curing.

The following is a summary list of reference numerals and the corresponding structure used in the above description of the invention.

LIST OF REFERENCE SYMBOLS

1 printing substrate
1*a* coated printing substrate
1*b* pinned printing substrate
1*c* completely cured printing substrate
1*d* printed product
2 inkjet print head
3*a* electrical radiation source in the first electrical operating mode
3*a* electrical radiation source in the second electrical operating mode
3*c* electrical radiation source
4 printing machine
5 shutter
6 wavelength spectrum in the first electrical operating mode
7 wavelength spectrum in the second electrical operating mode

The invention claimed is:

1. A method of curing radiation-curable coatings in a printing machine, the method comprising:

producing a printing substrate having a radiation-curable coating by:
- i) pinning the radiation-curable coating by applying a first radiation at a first location in the printing machine, and
- ii) completely curing the pinned radiation-curable coating by applying a second radiation at a location different than the first location in the printing machine;

using the same electrical radiation source or sources in a first electrical operating mode to apply the first radiation and in a second electrical operating mode to apply the second radiation; and providing the radiation applied by the electrical radiation source or sources with different radiation spectra in the first electrical operating mode and in the second electrical operating mode.

2. The method according to claim 1, which further comprises providing at least one gas-discharge lamp as the electrical radiation source or sources.

3. The method according to claim 2, which further comprises providing at least one xenon flash lamp or krypton flash lamp as the at least one gas-discharge lamp.

4. The method according to claim 3, which further comprises:

shielding the second location from the radiation of the electrical radiation source or sources during the pinning step; and shielding the first location from the radiation of the electrical radiation source or sources during the curing step.

5. The method according to claim 1, which further comprises using identical first and second electrical radiation sources to apply the first and second radiations.

6. The method according to claim 1, which further comprises shifting the radiation spectrum of the electrical radiation source or sources in the second electrical operating mode towards shorter wavelengths, as compared to the radiation spectrum of the electrical radiation source or sources in the first operating mode.

7. The method according to claim 1, which further comprises providing a wavelength width of the electrical radiation source or sources in the second electrical operating mode being different than a wavelength width of the electrical radiation source or sources in the first electrical operating mode.

8. The method according to claim 1, which further comprises providing the first electrical operating mode of the electrical radiation source or sources and the second electrical operating mode of the electrical radiation source or sources with a difference in at least one parameter selected from the group consisting of voltage, current and current density.

9. The method according to claim 1, which further comprises operating the electrical radiation source or sources in the first electrical operating mode at a voltage and flash time being different than a voltage and flash time in the second operating mode.

10. A printing machine, comprising:

an electrical radiation source or sources including at least one gas-discharge lamp configured for both:
- a) pinning a radiation-curable coating by applying a first radiation at a first location in the printing machine, and b) completely curing the pinned radiation-curable coating by applying a second radiation at a location different than the first location in the printing machine, the same electrical radiation source or sources being used in a first electrical operating mode to apply the first radiation and in a second electrical operating mode to apply the second radiation; and the radiation applied by the electrical radiation source or sources being provided with different radiation spectra in the first electrical operating mode and in the second electrical operating mode.

11. The printing machine according to claim 10, wherein one and the same radiation source is configured for a) pinning and b) completely curing.

12. A method, comprising:

using at least one gas-discharge lamp for:

a) pinning a radiation-curable coating by applying a first radiation at a first location in the printing machine, and b) completely curing the pinned radiation-curable coating by applying a second radiation at a location different than the first location in the printing machine, using the same electrical radiation source or sources in a first electrical operating mode to apply the first radiation and in a second electrical operating mode to apply the second radiation; and providing the radiation applied by the electrical radiation source or sources with different radiation spectra in the first electrical operating mode and in the second electrical operating mode.

* * * * *